Apr. 3, 1923.  
N. B. LAING ET AL  
1,450,889  
STORAGE BATTERY  
Filed Apr. 10, 1922
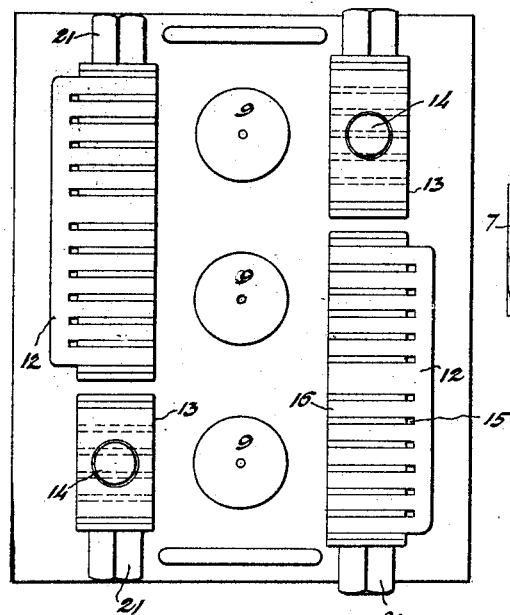
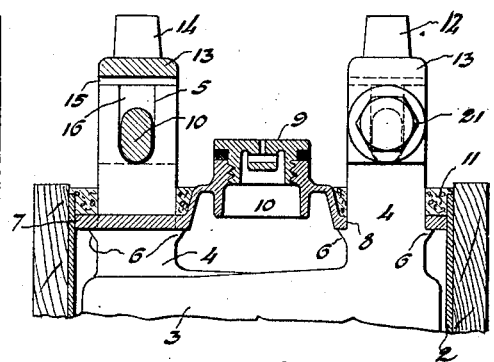
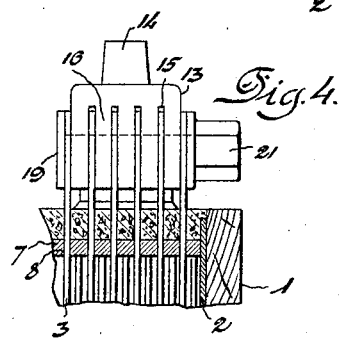
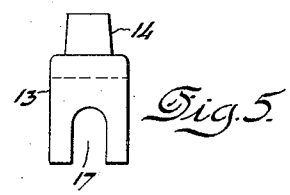
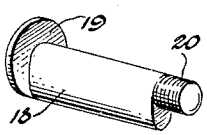
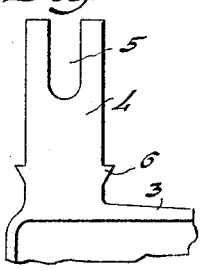
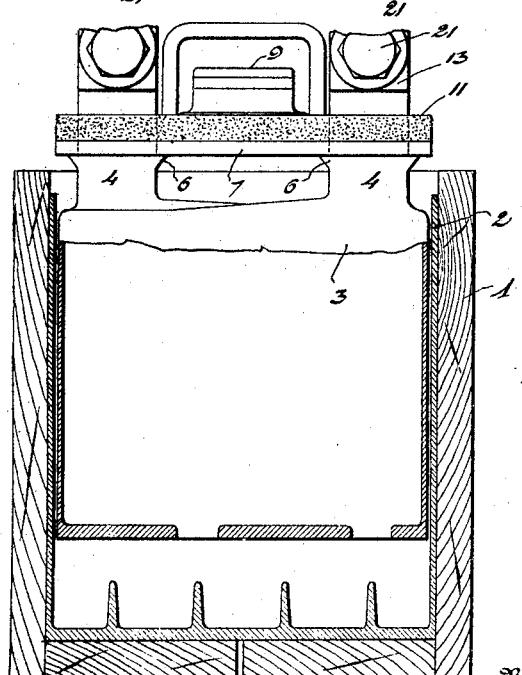
Inventors  
Norman B. Laing  
and Fred C. Rindfleish  
Attorneys Patented Apr. 3, 1923.

1,450,889

UNITED STATES PATENT OFFICE.

NORMAN B. LAING, OF DETROIT, AND FRED C. RINDFLISH, OF HIGHLAND PARK, MICHIGAN.

STORAGE BATTERY.

Application filed April 10, 1922. Serial No. 550,958.

*To all whom it may concern:*

Be it known that we, (*a*) NORMAN B. LAING and (*b*) FRED C. RINDFLISH, (*a*) a subject of the King of England and (*b*) a citizen of the United States of America, residing at (*a*) Detroit, county of Wayne, and State of Michigan, and (*b*) Highland Park, county of Wayne, and State of Michigan, have invented certain new and useful Improvements in Storage Batteries, of which the following is a specification, reference being had therein to the accompanying drawings.

Portable storage batteries as now constructed cannot be taken apart, examined, repaired and again assembled without using special lead-burning equipment and this has confined the repair of batteries to service stations or plants equipped for such purposes; it being practically impossible for the user of such battery to make any repairs.

Our invention aims to provide a portable storage battery in which plates are connected together and the cells interconnected by novel connectors, which are outside of the battery casing and are not burned or soldered together but so constructed that the user of the battery may dissemble it, replace injured plates or such other parts as may need replacing with new ones, and assemble the parts again, this being accomplished with ordinary tools, thus placing the battery in that category of home repaired automobile accessories.

Our invention further aims to provide a portable storage battery having plate-risers joined electrically by a detachable acid resisting connector of novel design which reduces resistance to a minimum.

Our construction possesses other advantages which will appear as the nature of the invention is better understood and reference will now be had to the drawing, wherein—

Figure 1 is a plan of a portable storage battery in accordance with our invention;

Fig. 2 is a vertical sectional view of the battery, showing how the lid and plate risers are articulated so as to be bodily removable relative to the battery casing after the marginal edges of the seal are broken, the lid and plates being shown partially elevated relative to the casing;

Fig. 3 is a vertical cross sectional view of a portion of the battery;

Fig. 4 is a longitudinal sectional view of a portion of the battery;

Fig. 5 is an end view of a connector;

Fig. 6 is an elevation of a plate riser, and

Fig. 7 is a perspective view of a clamping bolt.

In the drawing, the reference numeral 1 denotes an outer casing, and fitted within said casing is an inner casing 2 for a plurality of parallel plates 3, which together with other elements provide a storage battery, and since our invention resides in the construction of the upper portion of the battery, we consider it unnecessary to enter into a description as to the contents of the inner casing 2.

The plates 3 have the upper edges thereof provided with risers 4 which are comparatively flat and have the upper ends thereof slotted, as at 5, the slots being open and providing opposed parallel walls. The risers 4, adjacent said plates, have the edges thereof provided with shoulders or positioning supports 6 for a lid 7 fitted within the inner casing 2 and provided with slots 8 through which the risers 4 extend. The lid 7 has the usual apertured plug 9 and filling connection 10 permitting of water being placed in the battery and gas escaping therefrom.

The lid 7 is set in from the upper edges of the inner casing 2 and on said lid is a seal 11 of any acid resisting material that will seal the lid 7 relative to the inner casing, and the plate risers 4 relative to the lid 7. This is best brought out in Fig. 2 where it will be observed that the seal 11 has been cut or otherwise broken, at its marginal edges, to liberate the lid and plates, and since the seal surrounds the plate risers 4 and the lid 7 is on the supports 6, the entire structure can be bodily lifted from the battery casing. It is obvious that easy access can then be had to the plates and the interior of the casing. We attach considerable importance to the fact that the plate risers are positively anchored by the positioning supports 6 and the sealing material 11 and when this sealing material adheres to the casing 2 the battery is positively closed, yet in such a nature that an unskilled person may open the battery without the assistance of any expensive equipment.

The risers 4 of the plates 3 are necessarily disposed in parallelism and mounted on the upper ends of said risers are connectors 12 and 13, said connectors being similar except that the connectors 13 have terminals 14. Each connector is in the form of an oblong member provided with a multiplicity of parallel slots 15 forming arms 16 and it is into the slots 15 that the risers 4 extend to have an intimate face to face contact with the faces of the arms 16, and since the arms of each connector are integral with a backbone, like the tines of a comb, it is obvious that there is a positive connection between the arms 16 in contradistinction to washers interposed between the risers and connected by a tie rod or bolt.

The connectors 12 and 13 are slotted, as at 17 and these slots are adapted to register or longitudinally aline with the slots 5 of the risers 4 so that bolts 18 may extend through said slots. As shown in Fig. 7 the bolt is oblong in cross section and by engaging opposed walls of the slots 5 and 17 the bolts are prevented from rotating. At one end of each bolt is a comparatively flat head 19 and at the opposite end of the bolt is a threaded portion 20 on which may be screwed a nut 21. When the nut 21 is tightened the arms 16 and the risers 4 will be clamped against one another and joined electrically, the solid "backbone or through" portion of the connector acting as a header for the current, thus cutting the resistance of this type of bolted connector to a much lower value than would be obtained by using a bolt provided with washers or detached spacers.

By reference to Figs. 1 and 3 it will be noted that the plates 3 are in reverse order providing a set of risers at each side of the battery. It is possible to dispose the connectors horizontally as at 12, or to dispose them vertically as at 13. The flat heads 19 of the bolts 18 afford a sufficient gap between the connectors 12 and 13 and with the nuts 21 at the ends of the battery said nuts can be tightened to insure a thorough and intimate relation between the connectors and the plate risers.

From the foregoing it will be observed that the connectors can be easily and quickly removed, the seal 11 broken, the lid 7 lifted from the risers, and the plates or any other elements within the battery removed, repaired and replaced.

It is thought that the utility of our invention will be apparent without further description, and while in the drawing there is illustrated a preferred embodiment of our invention, it is to be understood that the structural elements are susceptible to such variations and modifications as fall within the scope of the appended claims.

What we claim is:—

1. As a new article of manufacture, a connector for battery plate risers, said connector having multiplicity of arms affording slots to receive plate risers and said arms having alining slots to receive means by which said arms and plate risers may be intimately clamped in engagement with the plate risers.

2. In a battery, plates having risers, connectors fitted on said plate risers, and means longitudinally of said connectors clamping said connectors on said plate risers, said means including non-rotatable bolts extending through said plate risers with nuts at the outer ends of said bolts.

3. In a battery construction, plates having risers, a connector having a multiplicity of arms affording slots to receive the plate risers, and means engaging the endmost connector arms producing a pressure longitudinally of said connector maintaining said plate risers and connector arms in intimate contacting relation.

4. In a storage battery, an inner casing, plates in said inner casing, flat blade like risers integral with said plates, lid supports on said risers, a lid on said supports and through which lid extend said risers, and connectors clamped on said risers.

5. A battery construction as called for in claim 4, wherein each connector is in the form of a member having a multiplicity of slots to receive the risers of said plates.

6. A battery construction as called for in claim 4, and a seal on said lid about the risers of said plates.

7. A storage battery comprising a casing, a lid, plates in said casing, said plates having risers extending through such lid, electrical connectors on the upper ends of said plate risers, and a seal connecting said lid, casing and plate risers so that said lid and plates may be united and bodily removable from said casing when said seal is broken at said casing.

8. A storage battery as in claim 7, and means carried by said plate risers to cooperate with the seal in supporting said lid.

9. In a storage battery, a casing, plates therein provided with risers, connectors on the risers of said plates, and a sealed closure for said casing engaging said plate risers so that said closure and plates may be bodily removed from said casing when said sealed closure is broken at said casing.

In testimony whereof we affix our signatures in presence of two witnesses.

NORMAN B. LAING.
FRED C. RINDFLISH.

Witnesses:
CHARLES W. STAUFFIGER,
KARL H. BUTLER.